US010069367B2

(12) United States Patent
Adam et al.

(10) Patent No.: US 10,069,367 B2
(45) Date of Patent: Sep. 4, 2018

(54) MODIFIED ATTACHMENT SYSTEM FOR SPRINGS IN A GENERATOR ROTOR

(71) Applicant: Mechanical Dynamics & Analysis, LTD, Latham, NY (US)

(72) Inventors: Andrew Adam, Latham, NY (US); Mark Roberts, Latham, NY (US)

(73) Assignee: Mechanical Dynamics & Analysis LLC, Latham, NY (US)

( * ) Notice: Subject to any disclaimer, the term of this patent is extended or adjusted under 35 U.S.C. 154(b) by 100 days.

(21) Appl. No.: 15/165,909

(22) Filed: May 26, 2016

(65) Prior Publication Data

US 2016/0352177 A1 Dec. 1, 2016

Related U.S. Application Data

(60) Provisional application No. 62/167,645, filed on May 28, 2015.

(51) Int. Cl.
| | |
|---|---|
| *H02K 3/48* | (2006.01) |
| *H02K 3/487* | (2006.01) |
| *H02K 3/24* | (2006.01) |
| *H02K 3/52* | (2006.01) |

(52) U.S. Cl.
CPC .............. *H02K 3/487* (2013.01); *H02K 3/24* (2013.01); *H02K 3/527* (2013.01)

(58) Field of Classification Search
CPC .......... H02K 3/24; H02K 3/487; H02K 3/505; H02K 3/527
USPC ................................ 310/61, 201, 214, 261.1
See application file for complete search history.

(56) References Cited

U.S. PATENT DOCUMENTS

| | | | | |
|---|---|---|---|---|
| 2,903,609 A | * | 9/1959 | Waddington | H02K 3/24 310/64 |
| 3,075,104 A | * | 1/1963 | Willyoung | H02K 3/22 310/54 |
| 4,876,469 A | * | 10/1989 | Khutoretsky | H02K 3/487 310/179 |
| 5,698,924 A | * | 12/1997 | Nishida | H02K 1/32 310/214 |
| 6,252,328 B1 | * | 6/2001 | Brem | H02K 3/16 310/201 |
| 6,316,852 B1 | * | 11/2001 | Semba | H02K 1/32 310/214 |
| 6,984,912 B2 | * | 1/2006 | Gomes De Lima | H02K 3/487 310/214 |
| 2008/0036336 A1 | * | 2/2008 | Salem | H02K 11/20 310/68 B |

(Continued)

OTHER PUBLICATIONS

Prior Art Fig. 1, and Figs. 2A-2D from U.S. Appl. No. 15/165,909, filed May 26, 2016, 2 pages.

*Primary Examiner* — Burton Mullins
(74) *Attorney, Agent, or Firm* — Burris Law, PLLC

(57) ABSTRACT

An assembly for use in a rotor of a turbine generator is provided that includes at least one creepage disposed on an upper load surface of copper windings. At least one slot spring is disposed on the creepage, and at least one amortisseur is disposed on the slot spring. A plurality of hollow locking members are disposed within apertures of the creepage, the slot spring, and the amortisseur. At least one slot wedge is disposed on the slot spring and the plurality of hollow locking members. At least one field retaining ring is disposed against one of the end portions of the rotor body and against the slot wedge.

10 Claims, 10 Drawing Sheets

(Detail A)

(56) References Cited

U.S. PATENT DOCUMENTS

2013/0221797 A1    8/2013  Riguso, Jr. et al.
2014/0232220 A1*   8/2014  Srinivasan ............... H02K 3/22
                                                            310/59

* cited by examiner (Detail A)

MODIFIED ATTACHMENT SYSTEM FOR SPRINGS IN A GENERATOR ROTOR

RELATED APPLICATIONS

This application claims the benefit of the filing date under 35 U.S.C. § 119(e) of Provisional U.S. Patent Application Ser. No. 62/167,645, filed May 28, 2015, which is hereby incorporated by reference.

FIELD

The present disclosure relates to electric generators and their rotors, and more specifically to mechanical attachment arrangements for components within a rotor of a turbine generator.

BACKGROUND

The statements in this section merely provide background information related to the present disclosure and may not constitute prior art.

Within the structure of rotors for turbine generators, a number of components are secured within a longitudinal slot around and on top of the electrical windings. These components serve functions to insulate and secure the electrical windings within the rotor slot, interact with the rotating magnetic field, and also to provide for the passage of cooling gases through passageways in the components. Among the components within a rotor body or housing slot are electrical windings/coils (also referred to as "copper turns" in the industry), creepage members, amortisseurs, springs, and wedges. Generally, the creepage members provide electrical insulation or dielectric separation from the copper turns, the amortisseurs reduce or eliminate the possibility of axial current flow, and the springs provide a radial force to press the amortisseurs against the wedges, which hold the components within the slot.

Each of the components within the slot includes a series of openings or vent holes, which facilitate radial cooling by the flow of cooling gases. The openings in each of the components, when properly installed within the rotor slot, are aligned with each other in order to provide for an unobstructed and efficient flow of cooling gas. Often times, however, because of the heating and cooling cycles of the generator rotor, among other causes, the components within the rotor slot migrate outwardly over time, which causes the openings to be misaligned, thus blocking the flow of cooling gas. This blockage of the cooling passageways is undesirable for efficient and continuous operation of the rotor.

An exemplary rotor and the misalignment issue as described above are disclosed in U.S. Application No. 2013/0221797 titled "Amortisseur Assembly and Apparatus to Maintain Radial Venting Hole Alignment." As shown in FIG. 1 of this application, the rotor 1 includes slots 2 with vent holes opening to radial vent paths 3. Also shown is a retaining ring 4, which generally holds the components as described above within their respective longitudinal slots.

FIGS. 2A-2D illustrate the issue of spring migration where a number of slot springs 5 have migrated outwardly from their nominal positions due to the heating and cooling cycles of the rotor during and between operation. Also shown in these figures are the electrical windings/coils 6, the creepage members 7, amortisseurs 8, wedges 9, vent holes 10 (which are misaligned as best shown in FIG. 2B), and the rotor body 11 containing the slots that house these components. The retaining ring as mentioned above is removed for clarity in these figures. Spring migration is undesirable because of the associated reduced operating output, vibration effects and down-time.

SUMMARY

In one form, an assembly for use in securing springs within a rotating generator rotor is provided that comprises a rotor defining an internal slot and opposed end portions, and copper windings disposed within the internal slot of the rotor body, wherein the copper windings defining internal gas passageways and an upper load surface. At least one creepage is disposed on the upper load surface of the copper windings, the creepage defining a plurality of apertures that are in alignment with the internal gas passageways of the copper windings. At least one slot spring is disposed on the creepage, the slot spring defining a plurality of apertures that are in alignment with the internal gas passageways of the copper windings, and at least one amortisseur is disposed on the slot spring, the at least one amortisseur defining a plurality of apertures that are in alignment with the internal gas passageways of the copper windings. A plurality of hollow locking members are disposed within apertures of the creepage, the slot spring, and the amortisseur, and the hollow locking members define upper flanges that are adapted to bear against the slot spring. At least one slot wedge is disposed on the slot spring and the plurality of hollow locking members, the slot wedge defining a plurality of apertures that are in alignment with the internal gas passageways of the copper windings. At least one field retaining ring is disposed against one of the end portions of the rotor body and against the slot wedge.

The teachings of the present disclosure also include a method of repairing a rotor of a turbine generator using the assembly as set forth above. It should also be understood that the present disclosure is not limited to the application of wind turbines and thus may be employed with electric generator rotors that experience similar misalignment of internal components while remaining within the scope of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 7C:
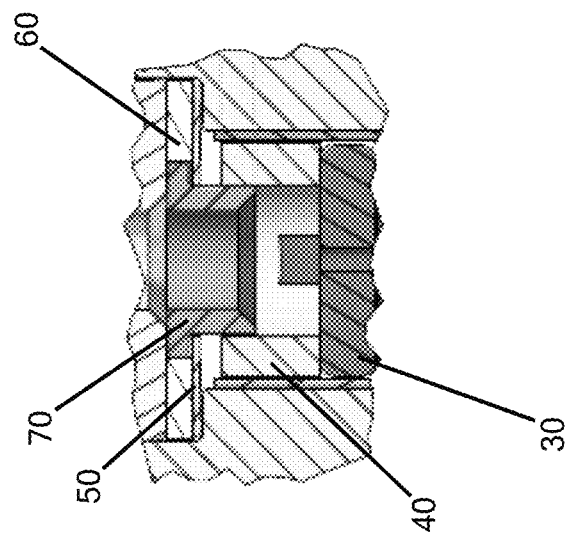
Figure 7B:
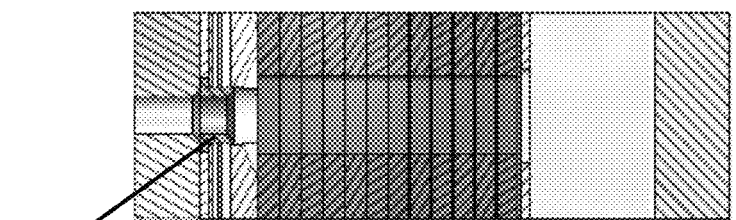
Figure 7A:
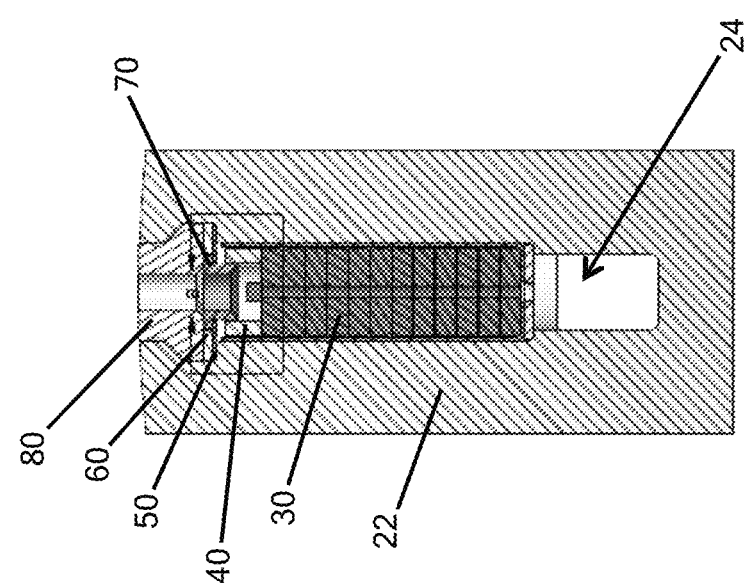
Figure 8B:
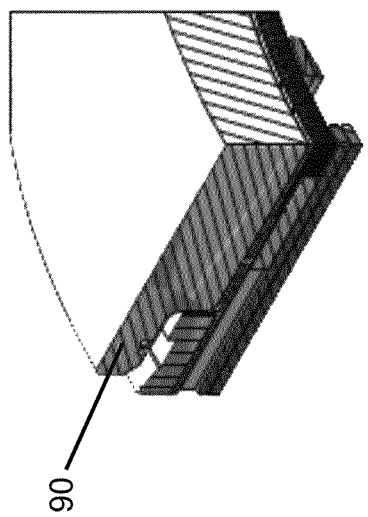
Figure 8A:
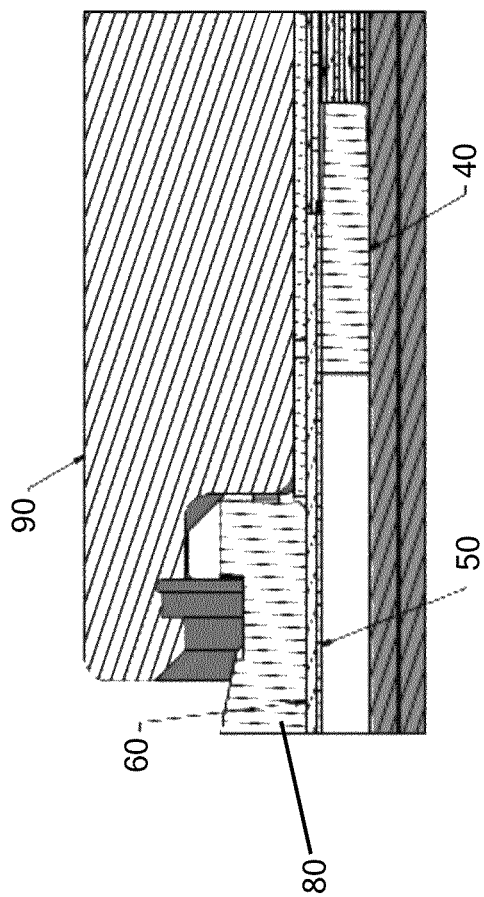

FIGS. 7A-C are end cross-sectional views of the assembly according to the teachings of the present disclosure in a turning gear position; and FIGS. 8A and 8B are cross-sectional views illustrating a retaining ring and its insulation constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 3A and 3B, an assembly for use in securing springs within a rotating generator of a turbine is illustrated and generally indicated by reference numeral 20. The assembly 20 comprises a rotor body 22 (only half of which is shown), which defines an internal slot 24 and opposed end portions 26 and 28. (It should be understood that only a portion of the length of the assembly 20 is illustrated for purposes of clarity due to the extensive length of the rotor). A number of components are disposed within the internal slot 24 of the rotor body 22, which are also shown in FIGS. 5, 6A-C, and 7A-C, and are now described in greater detail.

As shown, copper windings 30 are disposed within the internal slot 24 of the rotor body 22. By passing DC current through the copper windings 30, a magnetic field is generated during operation, which also generates a significant amount of heat, and thus the copper windings 30 define internal gas passageways 32 for cooling purposes. As further shown, the copper windings 30 also define an upper load surface 34, on which additional components are disposed.

Figure 1:
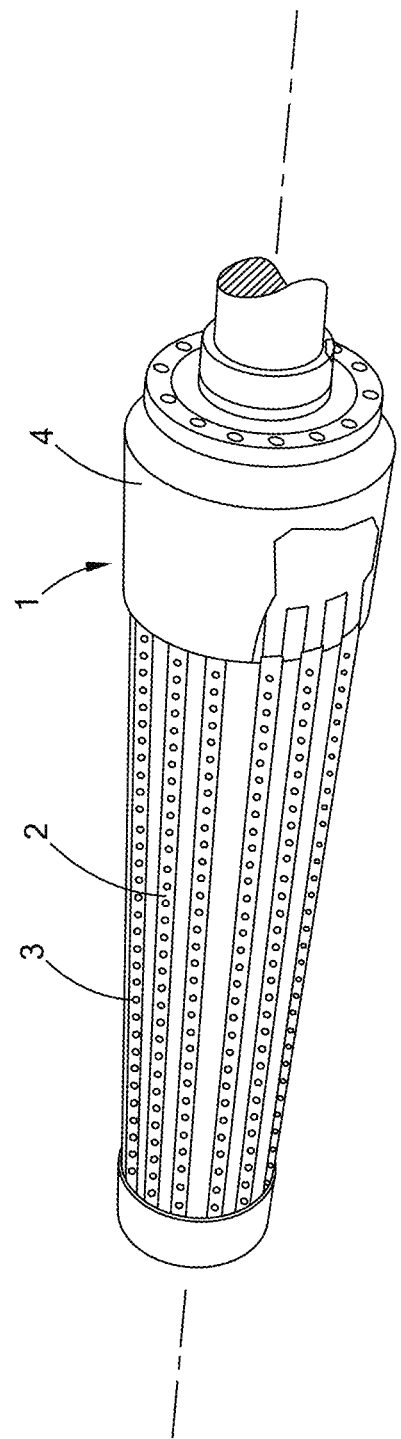
FIG. 1 is a perspective view of a prior art rotor of a rotating generator that employs radial cooling.
Figure 2A:
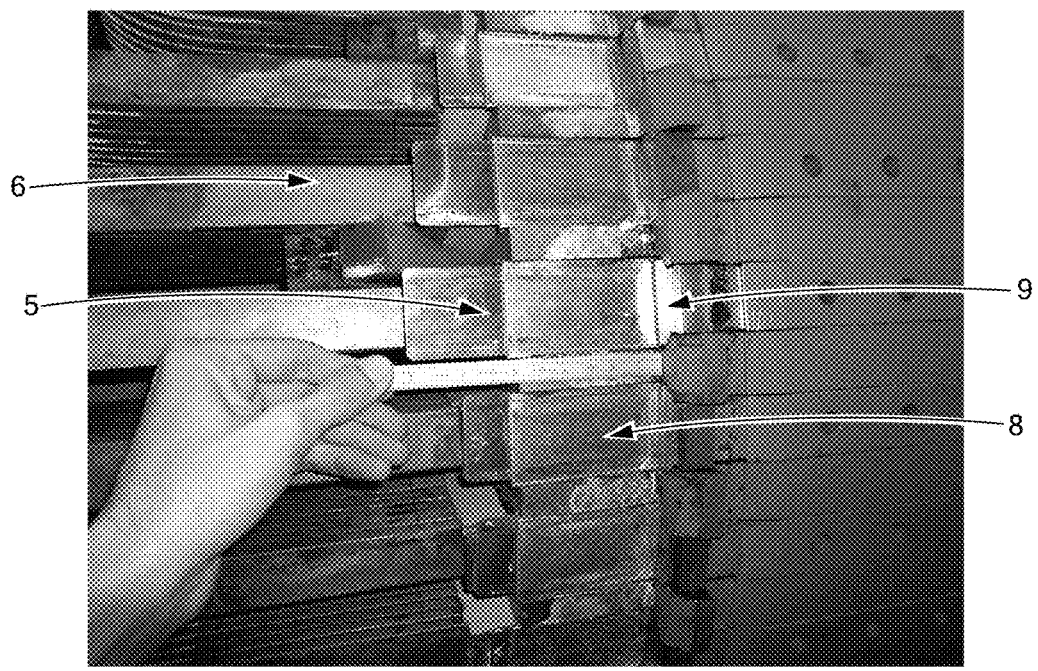
FIGS. 2A-2D are perspective views of end portions of a prior art rotor illustrating a problem of spring migration.
Figure 2B:
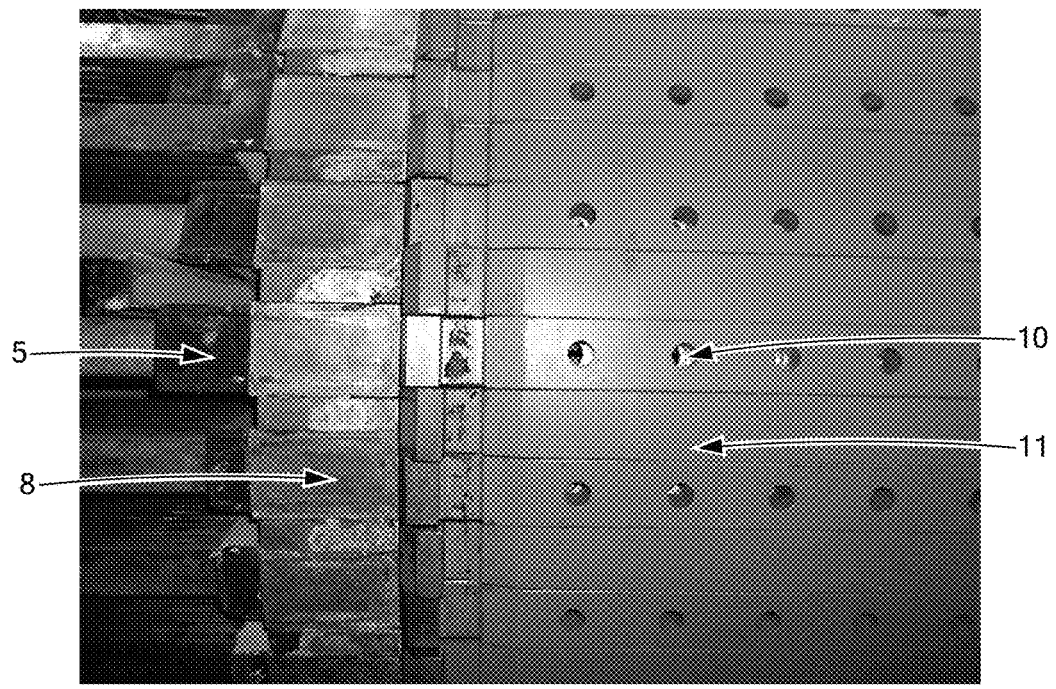
Figure 2C:
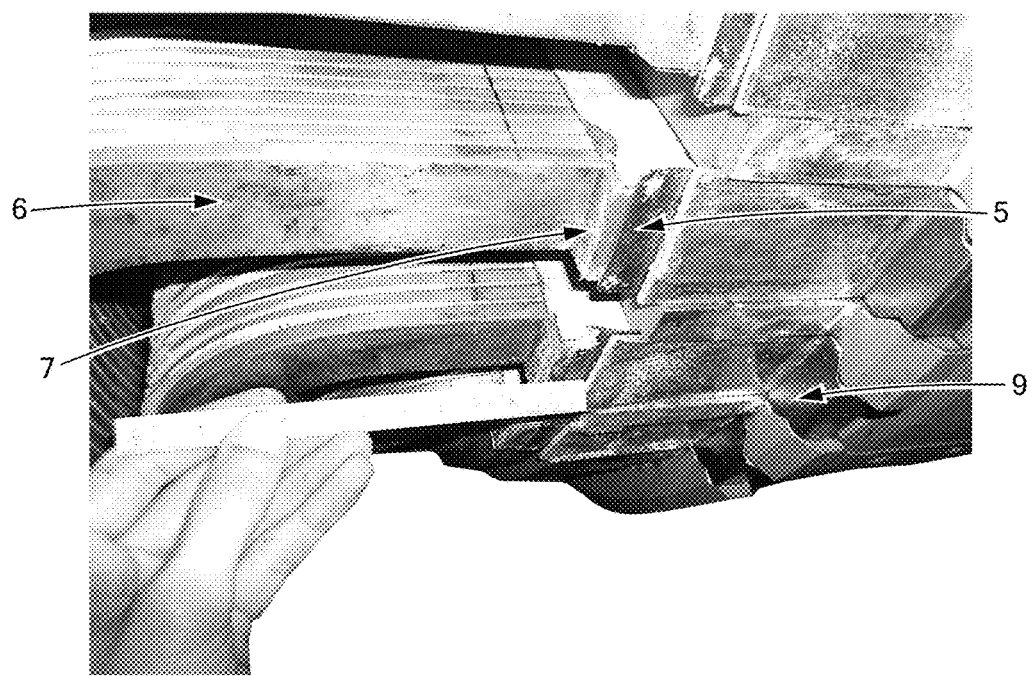
Figure 2D:
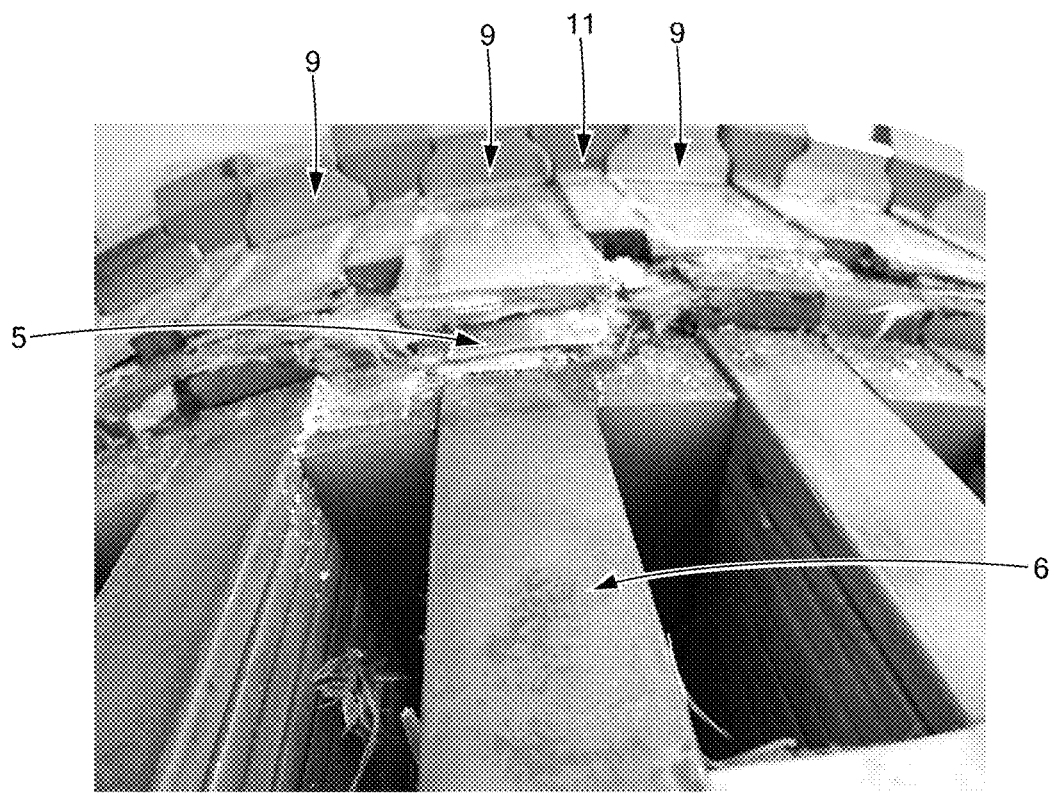
Figures 3, 4:
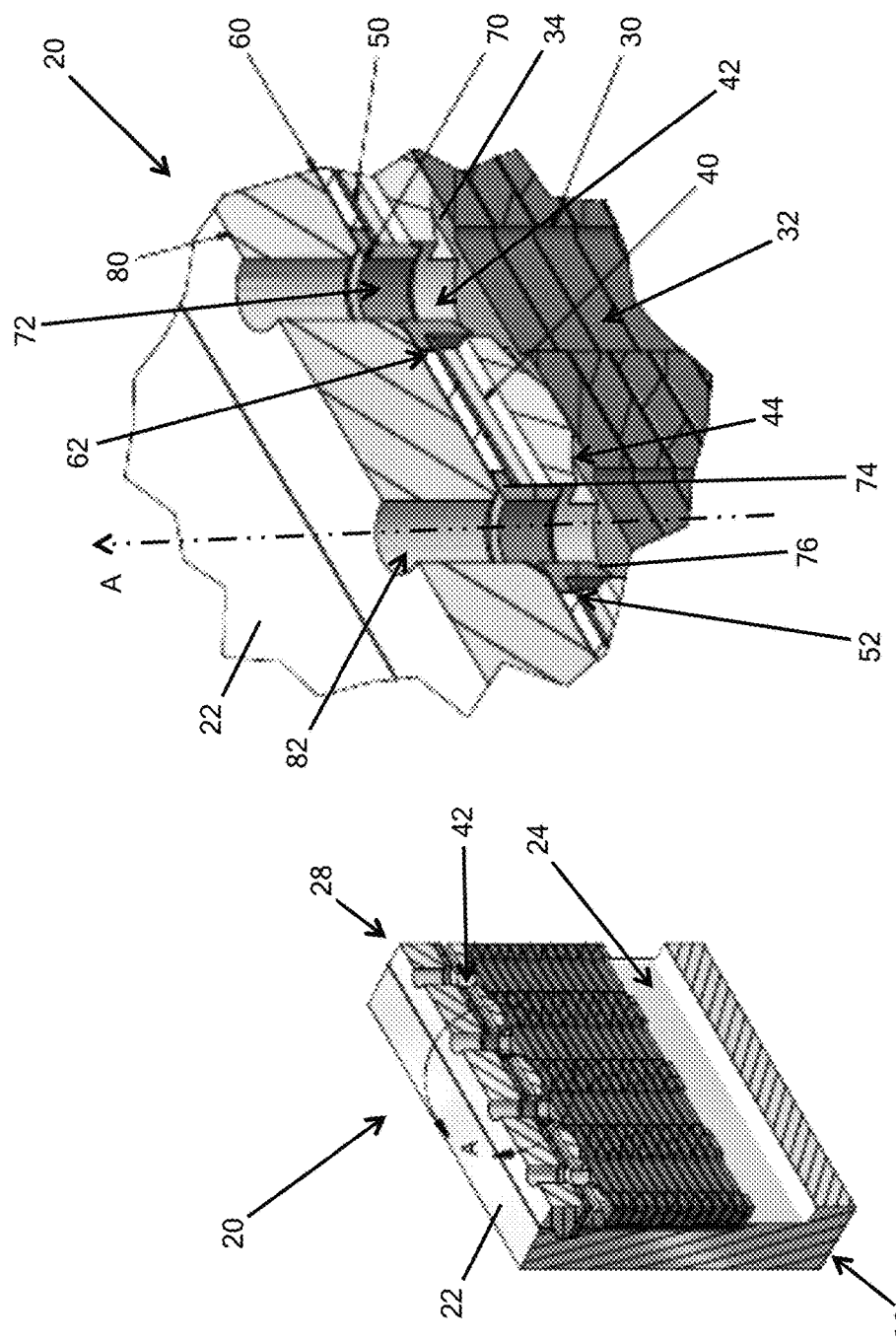
FIG. 3 is a perspective sectional view of an assembly for securing springs within a rotating generator of a turbine constructed in accordance with the teachings of the present disclosure.
FIG. 4 is an enlarged detail view of FIG. 3 illustrating the hollow locking members constructed in accordance with the teachings of the present disclosure.
Figure 5:
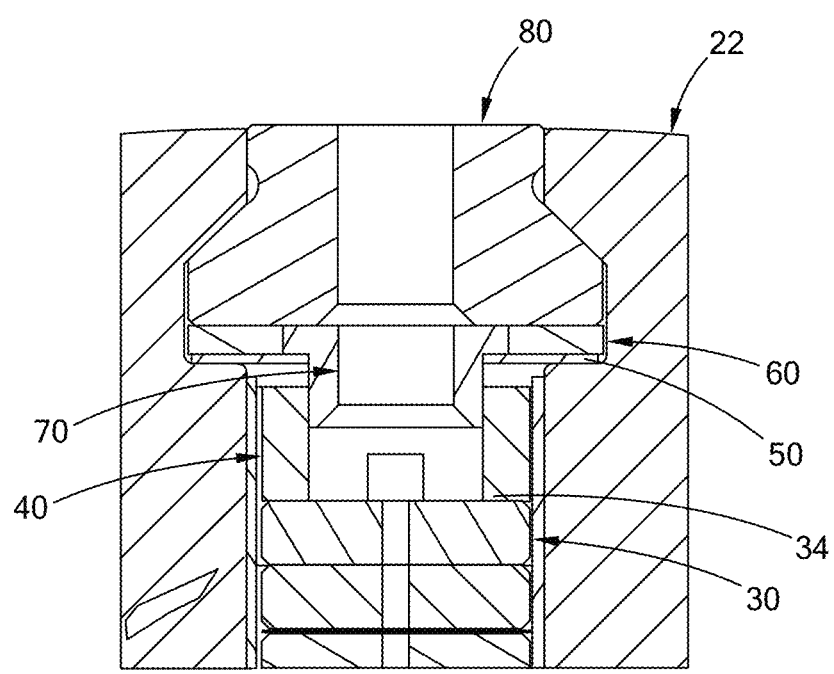
FIG. 5 is an enlarged partial cross-sectional end view illustrating components with the rotor slot and constructed in accordance with the teachings of the present disclosure.
Figure 6A:
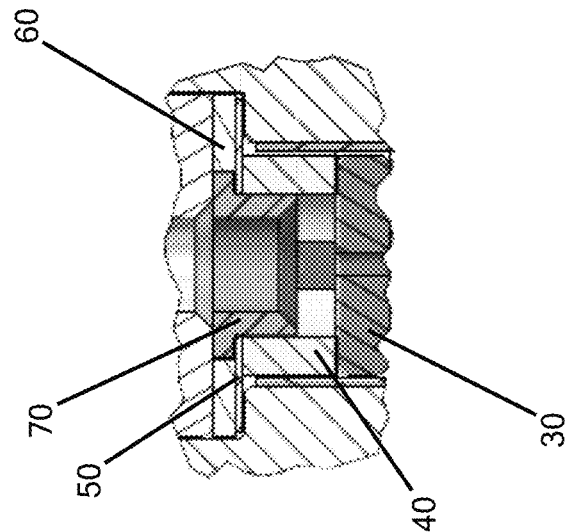
FIGS. 6A-6C are end cross-sectional views of the assembly according to the teachings of the present disclosure in a running/operating position.
Figure 6B:
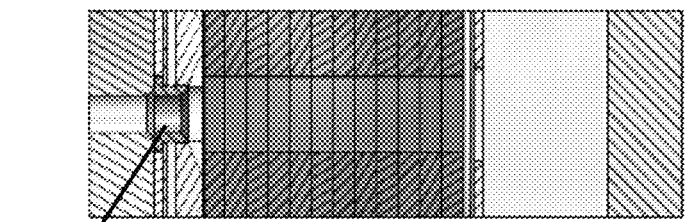
Figure 6C:
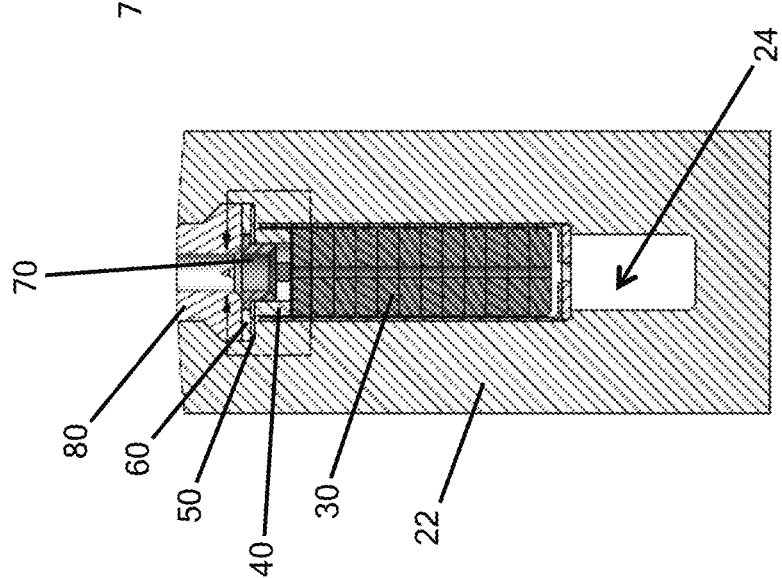

First, a creepage 40 is disposed on the upper load surface 34 of the copper windings 30. The creepage 40 provides electrical insulation, or dielectric separation between the copper windings 30 other components within the rotor slot 24. The creepage 40 in one form is a woven glass material. Like the copper windings 30, the creepage 40 defines a plurality of apertures 42 that are in alignment with the internal gas passageways 32 of the copper windings 42. As shown in FIG. 4, the creepage apertures 42 include a tapered or concave inlet 44, which facilitates the flow of cooling gases and provides for additional cooling proximate the upper load surfaces 34 of the copper windings 30. At least one creepage 40 is installed along the copper windings 30, and in one form, seven (7) creepage elements 40 are included end-to-end along the entire length of the rotor body 22.

Next, a slot spring 50 is disposed on the creepage 40, which provides a biasing force to secure the components within the rotor slot 24. The slot spring 50 also includes a plurality of apertures 52 that are in alignment with the internal gas passageways of the copper windings 32, thus providing continuity for the flow of the cooling gases in a radial direction. At least one slot spring 50 is installed on the creepage 40, and in one form, three (3) slot springs 50 are included end-to-end along the entire length of the rotor body 22. The slot spring 50 in one form is a high-strength, corrosion resistant metal such as a Nickel Chromium alloy. It should be understood, however, that other materials may be employed that provide the requisite biasing force and tolerance to environmental conditions while remaining within the scope of the present disclosure.

An amortisseur 60 is disposed on the slot spring 50, which generally dissipates eddy currents from the rotor body 22 and wedges 30. Similar to other components, the amortisseur 60 defines a plurality of apertures 62 that are in alignment with the internal gas passageways of the copper windings 32. The amortisseur 60 in one form is an Aluminum material but may also be other materials which function to dissipate the eddy currents. In one form, only one amortisseur 60 is employed, however, it should be understood that any number of amortisseur segments, disposed end-to-end along the length of the rotor body 22, may be employed while remaining within the scope of the present disclosure.

In order to reduce the occurrence of spring migration as set forth above, a plurality of hollow locking members 70 are disposed within apertures of the creepage 40, the slot spring 50, and the amortisseur 60. The hollow locking members 70 provide for the continuous flow of cooling gas through the internal components of the rotor body 22, as shown by arrow A, while providing an additional securing mechanism to reduce spring migration. More specifically, each locking member 70 includes a central passageway 72 to accommodate the flow of gas and an upper flange 74 that abuts the slot spring 50 as shown. Similar to the creepage 40, the locking members 70 define a chamfered inner bore 76 as shown in order to facilitate the flow of cooling gases.

The locking members 70 in one form are a woven glass material. In one form, two (2) hollow locking members 70 are adjacent each other in successive apertures along the creepage 40, the slot spring 50, and the amortisseur 60, and there are two (2) hollow locking members 70 per slot spring 50. It should be understood, however, that any number of hollow locking members 70 may be employed while remaining within the scope of the present disclosure. Additionally, the apertures of the creepage 42, the slot spring 52, and the amortisseur 60 through which the hollow locking members 70 are disposed are larger than adjacent apertures that do not include the hollow locking members 70.

As further shown, a slot wedge 80 is disposed on the slot spring 50 and the hollow locking members 70. The slot wedge 80 defines a dovetail shape (best shown in FIG. 5), and as such, functions to mechanically lock the components (e.g., copper windings 30, creepage 40, slot spring 50, amortisseur 60) within the rotor slot 24. Similar to the other components, the slot wedge 80 defines a plurality of apertures 82 that are in alignment with the internal gas passageways of the copper windings 32. The slot wedge 80 in various forms may be stainless steel or aluminum.

FIGS. 6A-C and 7A-C illustrate the assembly 20 in the running/operating position (6A-6C) and in the turning gear position (7A-7C).

Referring now to FIGS. 8A and 8B at least one field retaining ring 90 is disposed against one of the end portions of the rotor body 22 and against the slot wedge 80 to secure the components along the axial direction of the rotor.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An assembly comprising:
a rotor body defining an internal slot and opposed end portions;
copper windings disposed within the internal slot of the rotor body, the copper windings defining internal gas passageways and an upper load surface;
at least one creepage disposed on the upper load surface of the copper windings, the creepage defining a plurality of apertures that are in alignment with the internal gas passageways of the copper windings;
at least one slot spring disposed on the creepage, the slot spring defining a plurality of apertures that are in alignment with the internal gas passageways of the copper windings;
at least one amortisseur disposed on the slot spring, the at least one amortisseur defining a plurality of apertures that are in alignment with the internal gas passageways of the copper windings;
a plurality of hollow locking members disposed within apertures of the creepage, the slot spring, and the amortisseur, the hollow locking members defining upper flanges that abut the slot spring;
at least one slot wedge disposed on the slot spring and the plurality of hollow locking members, the slot wedge defining a plurality of apertures that are in alignment with the internal gas passageways of the copper windings; and
at least one field retaining ring disposed against one of the end portions of the rotor body and against the slot wedge.

2. The assembly according to claim 1 further comprising three slot springs.

3. The assembly according to claim 2 further comprising two hollow locking members per slot spring.

4. The assembly according to claim 3, wherein the two hollow locking members are adjacent each other in successive apertures along the creepage, the slot spring, and the amortisseur.

5. The assembly according to claim 1 further comprising two field retaining rings, one at each opposed end of the rotor.

6. The assembly according to claim 1, wherein the apertures of the creepage, the slot spring, and the amortisseur through which the hollow locking members are disposed are larger than adjacent apertures that do not include the hollow locking members.

7. The assembly according to claim 1, wherein the hollow locking members define a woven glass material.

8. The assembly according to claim 1, wherein the hollow locking members define a chamfered inner bore.

9. A turbine generator having a rotor including the assembly of claim 1.

10. A method of repairing a rotor of a turbine generator comprising installing the assembly of claim 1.

* * * * *